United States Patent [19]

Larsen et al.

[11] 4,162,425
[45] Jul. 24, 1979

[54] ULTRAVIOLET DETECTION TUBE QUENCHING CIRCUITRY

[75] Inventors: Theodore E. Larsen, Edina; James M. Celt, Mounds View, both of Minn.

[73] Assignee: Detector Electronics Corporation, Minneapolis, Minn.

[21] Appl. No.: 811,573

[22] Filed: Jun. 30, 1977

[51] Int. Cl.² .............................................. G01J 1/46
[52] U.S. Cl. .................... 315/150; 250/372; 315/125; 315/207; 315/340
[58] Field of Search ............... 315/119, 120, 123, 125, 315/207, 340, 150, 159; 250/372, 374, 554; 328/1, 6; 340/227 R, 228 R

[56] References Cited

U.S. PATENT DOCUMENTS

| | | | |
|---|---|---|---|
| 2,020,917 | 11/1935 | Stogoff | 315/150 |
| 3,621,262 | 11/1971 | Lecuyer | 250/554 X |
| 3,775,762 | 11/1973 | Trumble | 250/372 X |
| 3,793,552 | 2/1974 | Glascock, Jr. et al. | 250/372 X |

Primary Examiner—Eugene R. LaRoche
Attorney, Agent, or Firm—James R. Cwayna

[57] ABSTRACT

Circuitry directed to the rapid de-ionization of ultraviolet detectors by increasing the mobility of the ionized gases within the tubes which will enable the tubes to more effectively operate at low temperatures. The circuitry includes connecting circuitry for shorting the elements of the tube such that they will be at the same potential immediately after firing and also includes circuitry for the shunting of the tube immediately after firing to limit the number of ions generated in the discharge process. The shorting of the elements increases the surface area of negative electrodes for the recapture of the ions and the distance through which the ions must travel is reduced by a factor of one-half.

4 Claims, 4 Drawing Figures

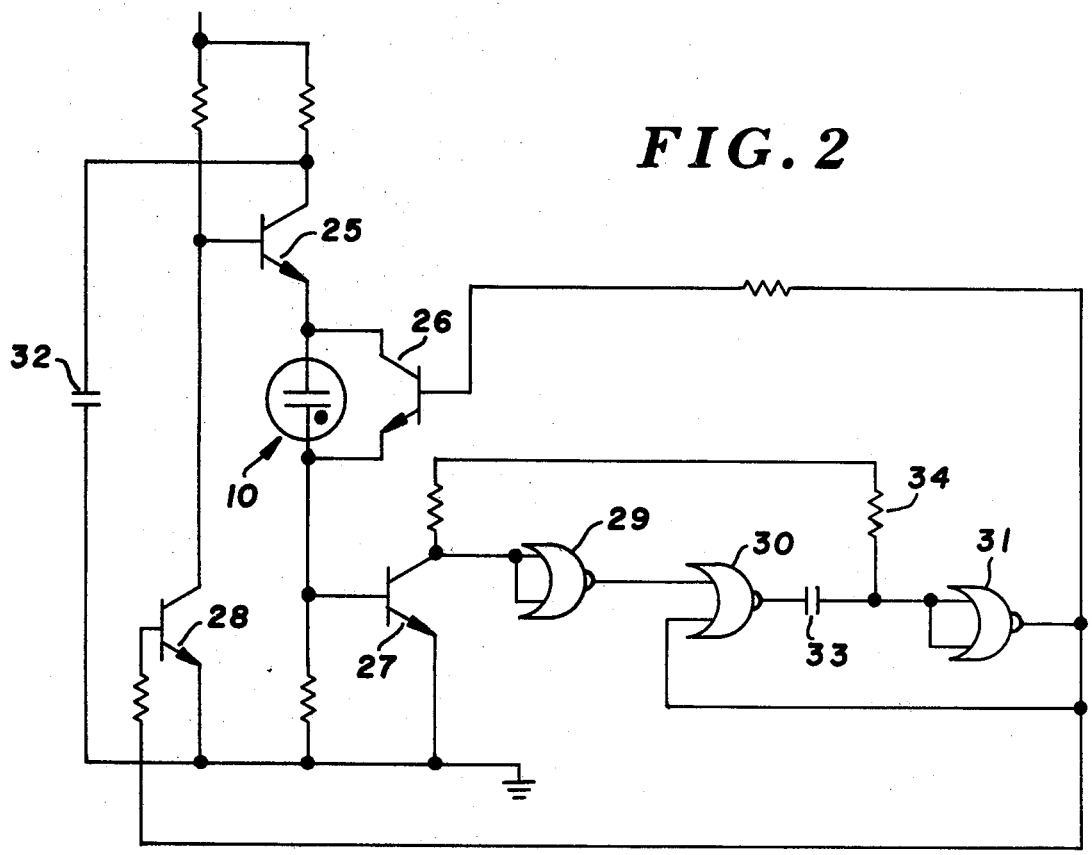
FIG. 2
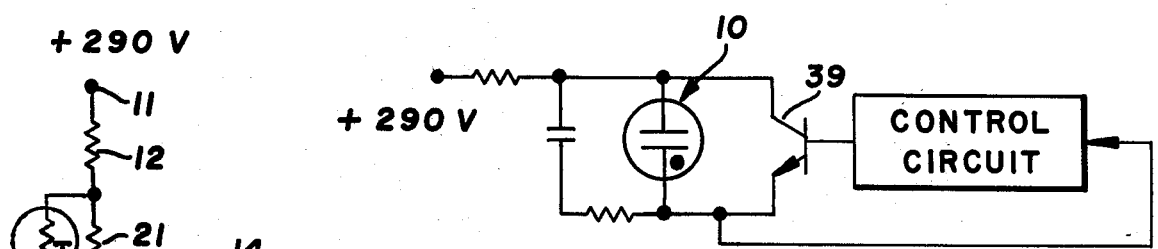
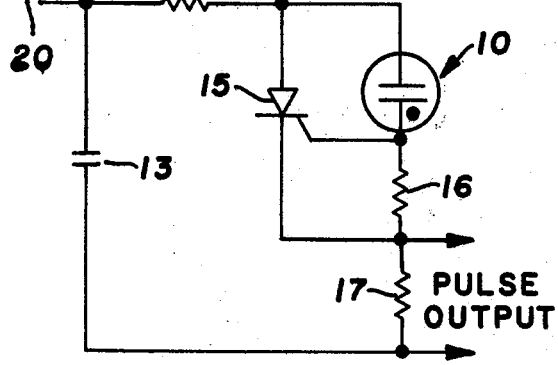
FIG. 1
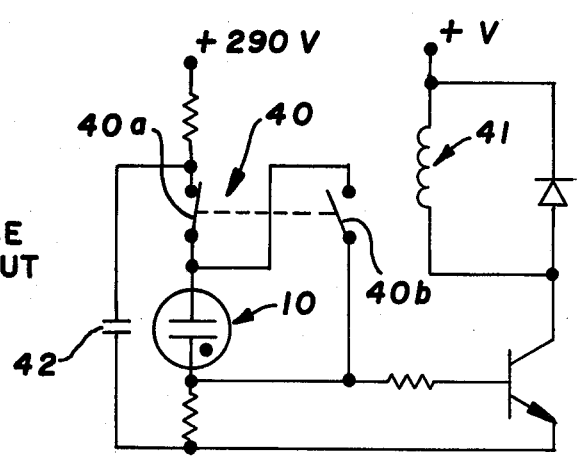
FIG. 4

ULTRAVIOLET DETECTION TUBE QUENCHING CIRCUITRY

FIELD OF THE INVENTION

This invention relates generally to circuitry for the detection of ultraviolet radiation, which circuitry includes an ultraviolet detection tube and more specifically to the circuitry for the rapid de-ionization of such ultraviolet detection tubes.

BACKGROUND AND OBJECTS OF THE INVENTION

The use of ultraviolet detection tubes is well known in the prior art. Through use of such devices, it has been found that the ability of the tube to respond to ultraviolet is definitely affected by the temperature to which the tube is exposed. The lowered temperature slows down the rate of travel of the ions resulting from tube discharge and for situations which require a high number of discharges within a short period of time, the presence of these ionized particles has been found to cause false discharges. In practice, and that particularly related to fire detection, the false operation of such a detector has had adverse effects both from the economic and safety standpoints. In such fire detection situations, it is important that the apparatus not only properly detect a flame which is the source of the ultraviolet, but also that the apparatus not respond to ambient conditions to provide false actuations of the fire control system.

The standard operation of a detector such as the Geiger-Mueller type is that when the electrodes of the detector are impressed with a voltage of sufficient magnitude, and when ultraviolet radiation strikes the cathode, the device will pass a current between the electrodes via the ionized gases created in the discharge process. The device will continue to conduct until the impressed voltage is reduced below the point that supports the ionization process. If, however, the voltage is restored and the ultraviolet radiation source is still present, the detector will again discharge for as long as the voltage level is sufficiently high. Thus, a tube of this type, in order to provide environmental testing for the presence of ultraviolet radiation must experience alternate ionization and a de-ionization of the gases between the electrodes of the detector. Should the de-ionization process not be sufficiently complete, restoration of the impressed voltage would result in discharge of the tube without ultraviolet initiation.

In temperatures above approximately 30° F., the de-ionization process can normally be accomplished by providing a short duration "off" time before restoring voltage across the electrodes. When the temperature drops, the mobility of the gases is decreased and the de-ionization process takes much longer.

The primary purpose of this invention is therefore, to decrease the de-ionization time by one of several various alternatives.

It is an object of this invention to decrease the de-ionization time of ulraviolet detection devices which devices contain an ionizable gas.

It is an object of this invention to increase the de-ionization surface of an ultraviolet detection tube after discharge thereof such that the increased surface area will decrease the time for the de-ionization of the gas within the tube.

It is a further object of this invention to control the number of ions generated in the discharge process of an ultraviolet device, which device contains an ionizable gas.

It is a further object of this invention to provide a means for shorting the electrodes of an ultraviolet detection tube for the rapid de-ionization of gases within the tube after discharge thereof.

It is yet a further object of this invention to provide a temperature responsive control circuitry for an ultraviolet detection device which will increase the time during which the electrodes of the device are below discharge voltage such that a longer time for de-ionization of the gases within the device is provided.

These and other objects and advantages of the invention will more fully appear from a consideration of the accompanying description made in connection with the accompanying drawings in which the same identifying numeral is utilized to identify the same or similar parts within the several views, and in which:

FIG. 1 is a schematic diagram of a preferred form of the invention which incorporates, as an alternative, a temperature variable time constant;

FIG. 2 is a schematic diagram of a solid state application of the concepts embodied in the invention;

FIG. 3 is a simplified schematic illustration of the circuitry; and,

FIG. 4 is a schematic diagram of an electromechanical version of the circuitry to control the de-ionization of the gases within the detection device.

In accordance with the accompanying drawings, the principle of rapid de-ionization of the ionized gas within ultraviolet tubes is accomplished with various control circuitry.

The preferred form of the invention and the circuitry therefore is illustrated in FIG. 1. This Figure includes a variation within itself and will be so described. In FIG. 1 as in all of the other views, the ultraviolet detection tube containing the ionizable gas is designated 10.

The basic circuitry of FIG. 1 includes a source of power 11 connected in series to a first resistance 12 and thereafter connected to a parallel circuit. The parallel circuit has, in one leg thereof, a capacitor 13, and in the other leg thereof, a resistance 14 connected in series to a second parallel circuit which second parallel circuit provides, in one leg thereof a switching member 15 and in the other leg thereof, the detector 10. As illustrated, the second parallel circuit is reconnected to a series resistance arrangement which includes a pair of resistances 16, 17. As also illustrated, the capacitor leg 13 and the switching-tube leg of the primary curcuit provide the outlet for the circuitry which will provide signal pulses.

The operation of this basic circuitry is as follows: The detector tube 10 is normally non-conductive. In this state, there is an impressed voltage across the electrodes. When an ultraviolet photon strikes the cathode of the tube 10, the gas therein becomes ionized and this ionization supports current flow through resistances 14, 16 and 17 as well as tube 10. When the voltage across 16 exceeds a predetermined value, the switching member 15 turns on, thus shorting the electrodes of the tube 10, bringing them to a common potential, thereby increasing the surface area for the attraction of the ions of gas for the deionization of the same. It should also be noted, that bringing these electrodes to the same potential will also reduce, again by a factor of two, the distance that an ionized particle must travel to reach a surface for deionization thereof. With the values selected, the turn on time for switching element 15 is approximately 0.5 milli-seconds and therefore the tube 10 is energized for only this short period of time, but without this additional switching circuitry the conducting time has been found to be approximately 10 milli-seconds. Therefore the conduction time is reduced by a factor of 20.

The switching element 15 will remain in the on or shorting position until the capacitor 13 is discharged through resistances 14 and 17 as determined by their respective values. When the current flow decreases to less than approximately 1 microamp, element 15 will switch to the off position and capacitor 13 will recharge through resistance 12 until the voltage thereacross reaches the voltage required for ionization if there is still ultraviolet present or to the total value of the impressed voltage if there is no ultraviolet present. The tube 10 is ready to discharge immediately after the voltage across capacitor 13 exceeds the ionization potential.

A modified form of the invention is also illustrated in FIG. 1. This modified form includes an additional parallel circuitry interposed, in series with the first resistance 12 and prior to the main parallel circuit. In the form shown, this added element includes a temperature responsive resistance 20 arranged in parallel with an additional resistance 21. Resistance 20 is commonly referred to as a thermistor and such a unit will increase in resistive value as the temperature decreases. With this inclusion, the time allowed for the tube 10 to de-ionize is increased due to the slower recharging of the capacitor 13. The operation of the circuit with this modification is varied only with the slower recharging effect. At normal temperatures or what may be termed elevated temperatures, this thermistor-resistance combination will not affect the total operation of the circuit as the mobility of ions is primarily affected by lower temperatures.

The circuitry illustrated in FIG. 2 is a solid state version of the relay circuit illustrated in FIG. 4. In this schematic view, the tube is again designated 10 and a plurality of switching members 25, 26, 27 and 28 are provided. It should be obvious from this drawing that the switching element 26 will bring the electrodes of the tube to a common potential when the same is energized or switched to its on position. Elements 29, 30 and 31 are control and analyzing gates. The output from each of these elements is determined by the input thereto. As illustrated, the recharging capacitor for the recharging of the tube 10 is designated 32 and an additional capacitor 33 is provided in series between gates 30, 31. The primary difference obtained with this circuit and the relay circuit of FIG. 4 as compared to the circuit of FIG. 1 is the means for switching power from the tube 10 immediately upon the receipt of a signal therefrom. This arrangement will limit the ionization of gases within tube 10 and, obviously, such a limitation will insure more rapid deionization of the gases in tube 10.

In its condition to detect ultraviolet but what may be termed a quiescent state, tube 10 is in a non-transmitting condition, elements 26, 27 and 28 are in a non-transmitting or off condition and 25 is in a conducting condition. In this state, the outputs of 29 and 31 are low and the output of 30 is high. Capacitor 32 is also charged to the limit of the input power supply.

When ultraviolet is present at the cathode of the tube 10, the tube transmits and switching element 27, receiving such transmission is turned on and a pulse is generated by 29, 30, 31, through capacitor 33 and resistance 34. The pulse width of the signal received by the switching element 27 is determined by the values of capacitor 33 and resitance 34. This pulse turns on switching transistors 26, 28 and when switch 28 turns on, switch 25 will turn off, thereby opening the circuit through the tube 10 and capacitor 32. The closing of switch 26 shorts or brings the electrodes of the tube 10 to a common potential. Immediately following the generated pulse, the circuit returns to its quiescent state and following charging of the capacitor 32 the circuitry is in condition to respond to ultraviolet exposure. This circuitry then is a limiting circuit as well as being a circuit which will provide for the rapid de-ionization of the gases within the tube 10.

The circuitry of FIG. 3 is a simple representation of a unit which will short the electrodes of the tube 10 after a signal is received from the tube. This signal is generated by the ultraviolet exposure of the tube and the shorting of the electrodes is provided by the switching element 39.

The circuitry of FIG. 4 is the mechanical-electrical equivalent of the circuitry of FIG. 2. In this illustration, a two position switching element 40 is provided and this element is controlled and actuated by a solenoid device 41. As illustrated, the switching element 40 is arranged to control energy flow to the tube 10 through one 40a switch element thereof and the shifting thereof will bring the other switch element 40b into closed position thereby shorting the electrodes of the tube 10. This switching is accomplished upon a signal being generated through tube 10 by the impingement of ultraviolet upon the same and immediately upon such generation, voltage to the tube 10 is terminated to again limit the number of ions which are created by such impingement. After the tube 10 has pulsed, the switching is accomplished and a hold time for the solenoid may be provided to insure that voltage is terminated for a predetermined period of time. Whether such timing device is included, the inherent actuation and deactuation of such a mechanical device will insure a sufficient time for gas de-ionization of the tube 10. Upon de-energization of the solenoid 41, the switches 40a, 40b will be returned to their conductive and nonconductive positions, and the tube will be in condition to respond to ultraviolet exposure.

With any of the forms shown and discussed herein, the purpose of the invention should be obvious. As stated, the primary consideration of the invention is to insure and speed the de-ionization of gases within the tube 10. This is obtained by increasing the deionization area of the tube, by limiting the number of ions or the extent of ionization of the tube or by a combination of both conditions.

It should be obvious that this invention provides a means for insuring the responsiveness of an ultraviolet detection tube, particularly when the same is exposed to conditions which would adversely effect normal de-ionization of the gases within the tube.

What is claimed is:

1. Circuitry for the rapid de-ionization of ionized gas within a gas filled, ultraviolet detection tube, said circuitry including:
   a. an ultraviolet detection, gas filled tube having at least a pair of electrodes, a first electrode thereof being connected to a source of power, a second electrode thereof being connected to a signal receiver current flowing from said first to said second electrode upon the ionization of the gas within the tube as a result of ultraviolet radiation thereof to deliver a signal to the receiver;

b. switching means being arranged between the source of power and the tube and being responsive to the signal generated by the tube, said switching means being normally closed but opening in response to a received signal to limit current flow to the tube and thereby limit the ionization of gases therein; and, c. a charging circuit arranged in parallel with the tube and including a capacitor therein.

2. The structure set forth in claim 1 and a temperature responsive resistance element arranged between said power source and said tube.

3. The structure set forth in claim 2 and said resistance element increasing in resistance upon a lowering of ambient temperature.

4. The structure set forth in claim 1 and second switching means and circuit means arranged to connect said first and second electrodes, said second switching means being normally open but closing in response to the signal generated by the tube and closing cooperatively with the opening of the switching means between the power source and the tube to immediately bring the electrodes of the tube to a common potential to assist in de-ionization of gas within the tube after the generation of a signal.

* * * * *